G. J. GUTH.
GASOLINE INDICATOR FOR AUTOMOBILES.
APPLICATION FILED FEB. 3, 1922.

1,427,803.   Patented Sept. 5, 1922.

Inventor
George J. Guth
By A. J. O'Brien
Attorney

Patented Sept. 5, 1922.

1,427,803

UNITED STATES PATENT OFFICE.

GEORGE J. GUTH, OF DENVER, COLORADO.

GASOLINE INDICATOR FOR AUTOMOBILES.

Application filed February 3, 1922. Serial No. 533,829.

*To all whom it may concern:*

Be it known that I, GEORGE J. GUTH, a citizen of the United States, residing at the city and county of Denver and State of Colorado, have invented certain new and useful Improvements in Gasoline Indicators for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an indicator adapted to be applied to automobiles for the purpose of providing a convenient and reliable means for enabling the operator to tell at a glance the amount of gasoline in the supply tank.

Some automobiles are provided with indicators which are located on the instrument board and tell the amount of gasoline on hand. There are, however, many automobiles of different makes which are not equipped with gasoline indicators, and it is the object of this invention to provide an apparatus that can be readily attached to an automobile and which will supply reliable indication on the instrument board.

In order to more clearly describe my invention, I shall have reference to the accompanying drawing, in which—

The same reference numbers will be used to indicate the same parts in the several views.

Figures 1, 2, 3, 4, 5, 6, 7:
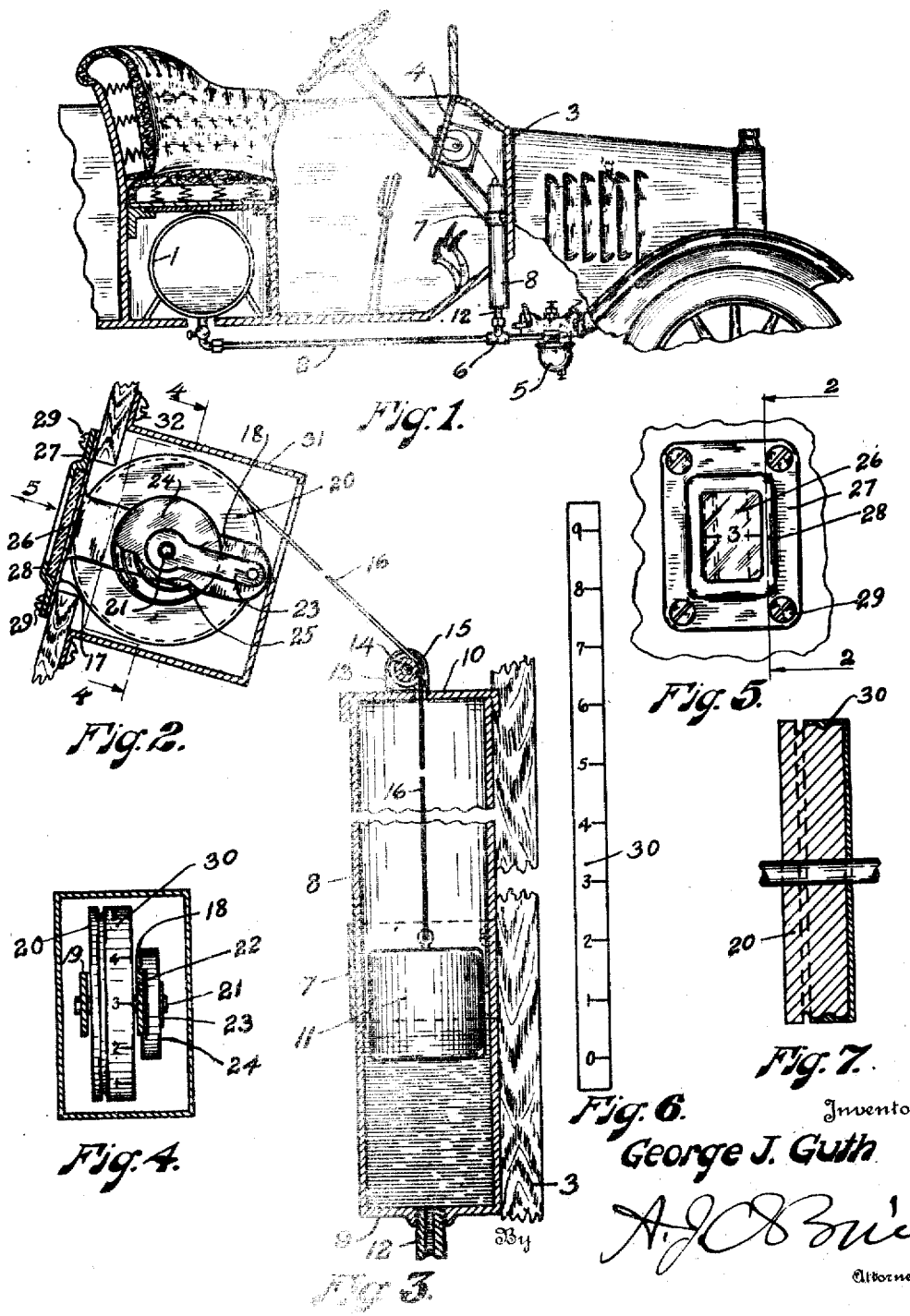
Fig. 1 is a side element of a part of an automobile with portions broken away in order to more clearly show the location and the relation of the various parts.
Fig. 2 is a view to an enlarged scale of my indicator showing a section taken on line 2—2 of Figure 5.
Fig. 3 is a longitudinal vertical section of the float chamber.
Fig. 4 is a section taken on line 4—4, Fig. 2.
Fig. 5 is a view looking in the direction of the arrow 5 in Fig. 2, and shows the appearance of my indicator.
Fig. 6 is a development of the surface of the scale which is secured to my indicator wheel.
Fig. 7 is a diametrical section of the indicator wheel.

Numeral 1 indicates the fuel tank of an automobile and 2 the pipe leading to the carburetor, while the dash board is indicated by the numeral 3 and the instrument board by 4. At a point intermediate the fuel tank and the carburetor 5, I provide a T coupling 6. Secured to the dash 3 by means of a pipe clamp 7 is a float chamber 8 whose bottom extends a short distance below the level of the fuel tank and whose top extends a short distance above the level of the upper portion of the fuel tank. The bottom 9 of the float chamber is perfectly integral therewith, as shown, although it may be formed by a cap which is threaded thereto, and the top 10 is preferably formed by a cap which can be removed for the purpose of introducing and removing the float 11. Float chamber 8 is connected to the gasoline pipe line by means of a short piece of pipe 12. The opening in pipe 12 is preferably made very small so that the level within the chamber will not vary every time the car tilts forward or backward, but will maintain an average which properly indicates the level in the tank 1. At the top 10 I provide a pair of spaced lugs 13 between which I mount a small pulley 14 on a spindle 15. A cord or wire 16 extends from the float to the indicator, which I will now describe.

My indicator consists of a plate 17 which has two arms 18 and 19 secured thereto in spaced relation. An opening (not shown) is cut in the plate 17 intermediate the said arms. A wheel 20 is non-rotatably secured to a shaft 21, the ends of which are rotatably mounted in suitable bearings in arms 18 and 19. The diameter of the wheel 20 is such that its circumference equals or exceeds the vertical measurement of the gasoline tank 1; thus, if the tank 1 is ten inches in diameter, the wheel 20 must have a circumference that is at least ten inches. Rotatably secured to one end of shaft 21 is a cup-like member 24 which is held in place by a spring 23 secured by a rivet to the end of arm 18. Within the member 24 I place a spring 25, of the type employed in watches: this spring has its inner end attached to the shaft 21 by means of a pin (not shown) and its outer end secured to the side of member 24 by a rivet, as shown, or in any other suitable manner. Member 24 is held in place by the spring 23 and has a plurality of pairs of notches 22 in its inner edge: these notches cooperate with the arm 18 and prevent the member 24 from being rotated by the spring 25. Spring 25 serves to move the wheel 20 in such a direction that the string 16 will always be taut. The tension of spring 25 may be adjusted by rotating the member 24, by means of which the spring may be wound or unwound until the most desirable results are obtained. A piece of glass 26 is clamped to the front surface of the plate 17 by means of a member 27 which is provided with flanges 28, and the whole is secured to the instrument board by means of screws 29. Secured to the wheel 20 and rotatable thereon is a member 30 whose sides are graduated in inches or gallons. Member 30 may be constructed and applied in various ways, but I prefer to make the same in the manner shown in Fig. 7, forcing the same over member 20 by a slight pressure. The reason why member 30 is rotatable on wheel 20 is so that it may be adjusted to give the proper indication after the device is installed. The wheel 20 and the other parts of my indicator may be enclosed in a housing 31, which is held in place by suitable means such as screws 32.

From the above it will appear that I have produced an apparatus that is adapted to be applied to any car having the fuel supply tank above the level of the carburetor, and which will give reliable indication of the gasoline level by means of an indicating device located on the instrument board.

Having now described my invention, what I claim is:

1. In combination with a liquid fuel tank and an instrument board, a tubular float chamber connected to said tank and adapted to contain liquid at the same level as in the tank, a float within said chamber, an indicator on said instrument board, said indicator comprising a supporting plate having an opening therein, a pair of spaced arms projecting from one side of said plate, an indicating wheel rotatably mounted between said arms, a spring secured to said wheel and to one of said arms and adapted to rotate the wheel in one direction, a string secured to the wheel and to the float and adapted to move said wheel against the tension of said spring, and a member provided with indicia secured to said wheel, said last named member being circumferentially adjustable with relation to said wheel.

2. In combination with a liquid fuel tank and an instrument board, a tubular float chamber connected to said tank and adapted to contain liquid at the same level as in the tank, a float within said chamber, an indicator on said instrument board, said indicator comprising a supporting plate having an opening therein, a pair of spaced arms projecting from one side of said plate, an indicating wheel rotatably mounted between said arms, a spring secured to said wheel and to one of said arms and adapted to rotate the wheel in one direction, means for adjusting the tension of said spring, a string secured to the wheel and to the float and adapted to move said wheel against the tension of said spring, and a member provided with indicia secured to said wheel, said last named member being adjustable with relation to said wheel.

In testimony whereof I affix my signature

GEO. J. GUTH